United States Patent
Sima et al.

(10) Patent No.: US 11,651,139 B2
(45) Date of Patent: May 16, 2023

(54) TEXT OUTPUT METHOD AND SYSTEM, STORAGE MEDIUM, AND ELECTRONIC DEVICE

(71) Applicant: NANJING SILICON INTELLIGENCE TECHNOLOGY CO., LTD., Jiangsu (CN)

(72) Inventors: Huapeng Sima, Jiangsu (CN); Manhong Wang, Jiangsu (CN); Yiping Tang, Jiangsu (CN)

(73) Assignee: Nanjing Silicon Intelligence Technology Co., Ltd., Jiangsu (CN)

( * ) Notice: Subject to any disclaimer, the term of this patent is extended or adjusted under 35 U.S.C. 154(b) by 0 days.

(21) Appl. No.: 17/915,471

(22) PCT Filed: May 25, 2022

(86) PCT No.: PCT/CN2022/095062
§ 371 (c)(1),
(2) Date: Sep. 28, 2022

(87) PCT Pub. No.: WO2022/262542
PCT Pub. Date: Dec. 22, 2022

(65) Prior Publication Data
US 2023/0121683 A1    Apr. 20, 2023

(30) Foreign Application Priority Data
Jun. 15, 2021    (CN) .......................... 202110662309.7

(51) Int. Cl.
*G06F 17/00*    (2019.01)
*G06F 40/103*    (2020.01)
(Continued)

(52) U.S. Cl.
CPC .......... *G06F 40/103* (2020.01); *G06F 40/166* (2020.01); *G10L 15/26* (2013.01)

(58) Field of Classification Search
CPC ....... G06F 40/103; G06F 40/166; G10L 15/26
See application file for complete search history.

(56) References Cited

U.S. PATENT DOCUMENTS 5,649,060 A * 7/1997 Ellozy .................... G11B 27/10
704/235
5,970,453 A * 10/1999 Sharman ................ G10L 13/07
704/260

(Continued)

FOREIGN PATENT DOCUMENTS

| CN | 101996631 A | 3/2011 |
| CN | 103077718 A | 5/2013 |

(Continued)

OTHER PUBLICATIONS

Yuan, Fang et al., "Research on short text filtering algorithms based on "text alignment"," Information & Communications, School of Information Technology and Media, Information Technology Center, Hexi College, Zhangye 734000, Gansu, Issue 9, 2013, Sum. No 131.

(Continued)

*Primary Examiner* — Mohammed H Zuberi
(74) *Attorney, Agent, or Firm* — Foley & Lardner LLP (57) ABSTRACT

Embodiments of the present application provide a text output method and system, a storage medium, and an electronic device. The system includes at least an automatic speech recognition ASR model group, a text alignment model, and a re-scoring model that are sequentially connected, where the ASR model group includes a plurality of ASR models each configured to convert input audio data into respective first texts; the text alignment model is configured to perform alignment for a plurality of first texts, to obtain a plurality of target texts, where lengths of the plurality of target texts are all equal; and the re-scoring model is configured to score words/terms at each alignment (Continued)

position of the plurality of target texts, to obtain a word/term with the highest score at each alignment position, as a target word/term, and determine the target word/terms, as an output text, by the respective alignment positions.

20 Claims, 3 Drawing Sheets (51) Int. Cl.
*G10L 15/26* (2006.01)
*G06F 40/166* (2020.01)

(56) References Cited

U.S. PATENT DOCUMENTS

| | | | | |
|---|---|---|---|---|
| 6,064,957 | A * | 5/2000 | Brandow | G06F 40/194 |
| | | | | 704/235 |
| 7,203,648 | B1 * | 4/2007 | Ostermann | G10L 15/26 |
| | | | | 704/275 |
| 7,567,896 | B2 * | 7/2009 | Coorman | G10L 13/06 |
| | | | | 704/10 |
| 7,668,718 | B2 * | 2/2010 | Kahn | G10L 15/063 |
| | | | | 704/270 |
| 7,761,296 | B1 | 7/2010 | Bakis et al. | |
| 7,792,675 | B2 * | 9/2010 | Ramaswamy | G10L 15/18 |
| | | | | 704/270 |
| 8,170,289 | B1 | 5/2012 | Feng et al. | |
| 8,756,064 | B2 * | 6/2014 | Kopparapu | G10L 15/06 |
| | | | | 704/260 |
| 9,514,741 | B2 * | 12/2016 | Jost | G10L 15/063 |
| 9,934,775 | B2 * | 4/2018 | Raitio | G10L 13/0335 |
| 10,019,995 | B1 * | 7/2018 | Abramovitz | G09B 5/04 |
| 10,423,721 | B2 * | 9/2019 | Zimmerman | G06F 40/186 |
| 10,783,880 | B2 * | 9/2020 | Ash | G10L 25/87 |
| 10,796,686 | B2 * | 10/2020 | Arik | G10L 13/08 |
| 11,017,761 | B2 * | 5/2021 | Peng | G10L 25/30 |
| 11,062,615 | B1 * | 7/2021 | Speciner | G09B 5/06 |
| 11,238,843 | B2 * | 2/2022 | Arik | G10L 13/027 |
| 11,256,882 | B1 * | 2/2022 | Waibel | G06F 40/166 |
| 2002/0065653 | A1 | 5/2002 | Kriechbaum et al. | |
| 2007/0244702 | A1 * | 10/2007 | Kahn | G10L 15/22 |
| | | | | 704/E15.04 |
| 2009/0190899 | A1 * | 7/2009 | Bangalore | H04N 21/440236 |
| | | | | 386/335 |
| 2018/0081989 | A1 | 3/2018 | Nakao et al. | |
| 2018/0130484 | A1 | 5/2018 | Dimino, Jr. et al. | |
| 2022/0310097 | A1 * | 9/2022 | Kim | G10L 15/063 |

FOREIGN PATENT DOCUMENTS

| | | |
|---|---|---|
| CN | 103474069 A | 12/2013 |
| CN | 106128462 A | 11/2016 |
| CN | 108538285 A | 9/2018 |
| CN | 108962224 A | 12/2018 |
| CN | 109101475 A | 12/2018 |
| CN | 109215630 A | 1/2019 |
| CN | 110148416 A | 8/2019 |
| CN | 110491383 A | 11/2019 |
| CN | 110516248 A | 11/2019 |
| CN | 112329926 A | 2/2021 |
| CN | 112435656 A | 3/2021 |
| CN | 112765976 A | 5/2021 |
| CN | 112885336 A | 6/2021 |
| CN | 113314124 A | 8/2021 |

OTHER PUBLICATIONS

Yujuan, Zhan et al., "A study on the application of speech recognition technology in recitation checking based on the open platform of IFLYTEK," Editorial Board of "China Education Informatization": mis@moe.edu.cn, Artificial Intelligence Column.

* cited by examiner

```
asr 1: Today the whether isindeed good
asr2: Todayweather is indeed good
asr3: Today the weather is indeedwood aligment result:
('Today', 'the', 'weather', 'is', 'indeed', 'wood')
('Today', '**','weather', 'is', 'indeed', 'good')
('Today', 'the', 'whether', 'is', 'indeed', 'good')

finalresult:
['Today', 'the', 'weather', 'is', 'indeed', 'good']
```

Fig.4

```
asr 1: What isa difference between an inactivated vaccine and amRNA vaccine
asr2: What is a difference between an inactivated vaccine end an mRNA vaccine
asr3: Whatisa difference between an inactivated waxy and an mRNA waxy
asr4: What isa difference between an inactivityvaccine and amRNA vaccine
asr5: What'sa difference between an inactivated vaccine and an mRNA vaccine aligment result:
('What', 'is', 'a', 'difference', 'between', 'an', 'inactivated', 'waxy', '**', 'and', 'an', 'm', 'R', 'N', 'A', 'waxy')
('What', 'is', 'a', 'difference', 'between', 'an', '**', 'inactivity', 'vaccine', 'and', 'am', 'R', 'N', 'A', 'vaccine')
('What', 'is', 'a', 'difference', 'between', 'an', '**', 'inactivated', 'vaccine', 'end', 'm', 'R', 'N', 'A', 'vaccine')
('What', 'is', 'a', 'difference', 'between', 'an', 'in', 'activated', 'vaccine', 'and', 'am', 'R', 'N', 'A', 'vaccine')
('What's', '', 'a', 'difference', 'between', 'an', '', 'inactivated', 'vaccine', 'and', 'm', 'R', 'N', 'A', 'vaccine')

finalresult:
['What', 'is', 'a', 'difference', 'between', 'an', '**', 'inactivated', 'vaccine', 'and', 'm', 'R', 'N', 'A', 'vaccine']
```

Fig.5

019.7, filed with
TEXT OUTPUT METHOD AND SYSTEM, STORAGE MEDIUM, AND ELECTRONIC DEVICE The present application is a National Stage Entry under 35 U.S.C. § 371 of International Application No. PCT/CN2022/095062, filed May 25, 2022, which claims the priority to Chinese Patent Application No. 202110662309.7, filed with the China National Intellectual Property Administration on Jun. 15, 2021 and entitled "TEXT OUTPUT METHOD AND SYSTEM, STORAGE MEDIUM, AND ELECTRONIC DEVICE", each of which are incorporated herein by reference in their entirety.

FIELD OF THE INVENTION

The present application relates to the technical field of speech recognition, and in particular, to a text output method and system, a storage medium, and an electronic device.

BACKGROUND OF THE INVENTION

Automatic speech recognition (ASR for short) technologies are used to transcribe speech of a speaker into a corresponding text. At present, a speech recognition system applied in the industry is generally a single-speech recognition system. To be specific, merely one acoustic model is provided, and after a preliminary result is output from the acoustic model, a final result is optimized by using a series of back-end processing methods. With rapid development of neural networks, various modeling methods emerge in an endless stream. In a process of implementation of speech recognition, a plurality of speech recognition systems with different effects may be obtained by training different acoustic model structures or by adjusting decoding parameters of a same model.

There tends to be complementarity between the foregoing acoustic models with different structures or parameters. In this case, if different acoustic models cooperate with each other, a word error rate (WER for short) in a model training process may be significantly reduced, thereby improving a recognition rate of the system. However, in the prior art, fusion of different acoustic models cannot achieve an ideal fusion effect.

At present, there is not yet effective solution for a problem that a plurality of ASR models cannot be efficiently fused in the prior art.

SUMMARY OF THE INVENTION

Embodiments of the present application provide a text output method and system, a storage medium, and an electronic device, to resolve at least a problem in the prior art that a plurality of ASR models cannot be efficiently fused.

In an embodiment of the present application, a text output system is provided. The system includes at least an automatic speech recognition (ASR) model group, a text alignment model, and a re-scoring model that are sequentially connected to each other, where the ASR model group includes a plurality of ASR models, and each ASR model is configured to convert input audio data into respective first texts; the text alignment model is configured to perform alignment for a plurality of first texts to obtain a plurality of target texts, where lengths of the plurality of target texts are all equal; and the re-scoring model is configured to score words/terms at each alignment position of the plurality of target texts to obtain, as a target word/term, a word/term with the highest score at each alignment position and determine the target word/terms, as an output text, by the respective alignment positions.

In an embodiment of the present application, a text output method is further provided, including: converting input audio data into a first text through an ASR model group, where the ASR model group includes a plurality of ASR models; performing alignment for a plurality of first texts through a text alignment model to obtain a plurality of target texts, where lengths of the plurality of target texts are all equal; and scoring words/terms at each alignment position of the plurality of target texts through a re-scoring model to obtain, as a target word/term, a word/term with the highest score at each alignment position, and determining the target word/terms as an output text by the respective alignment positions.

In an embodiment of the present application, a computer readable storage medium is further provided, in which a computer program is stored, and used for implementing, when being executed, the steps of the foregoing method embodiment.

In an embodiment of the present application, an electronic device is further provided, including a memory and a processor, where a computer program is stored in the memory, and the processor is configured to execute the computer program to implement the steps of the foregoing method embodiment.

According to the embodiments of the present application, the text output system is constructed by using the automatic speech recognition ASR model group, the text alignment model, and the re-scoring model that are sequentially connected. After a same piece of speech is respectively recognized and is converted into a plurality of texts by the plurality of ASR models, the plurality of recognized texts are aligned through the text alignment model and then are re-scored, so as to obtain a text that is closest to real speech. In this way, a problem that the plurality of ASR models cannot be efficiently fused is resolved. In this case, a plurality of texts may be aligned effectively, thereby greatly improving accuracy of speech recognition.

BRIEF DESCRIPTION OF THE DRAWINGS

The accompanying drawings illustrated herein are provided for further understanding of the present application, as a part of the present application. The exemplary embodiments of the present application are described for explaining the present application, not limiting the present application. In the accompanying drawings:

FIG. 4 is a diagram of an alignment result according to an embodiment of the present application; and FIG. 5 is a diagram of still another alignment result according to an embodiment of the present application.

DETAILED DESCRIPTION OF THE EMBODIMENTS

The present application is described below in detail with reference to the accompanying drawings in conjunction with the embodiments. It should be noted that the embodiments in the present application along with the features of the embodiments may be combined with each other in the case of no confliction.

It should be noted that the terms "first", "second", and the like used in this description, the claims, and the accompanying drawings of the present application are intended to distinguish between similar objects, but are not necessarily intended to describe a particular sequence or a sequential order.

There tends to be complementarity between acoustic models with different structures or parameters. In other words, different acoustic models cooperate with each other, and therefore a word error rate (WER) in a model training process may be significantly reduced, thereby improving a recognition rate of the system. Different acoustic models cooperate with each other, and recognition results of a plurality of models are fused to obtain a better final result. This is model fusion. In the prior art, model fusion methods may be classified into the following three types.

The first type is model fusion based on a network layer. According to this fusion mode, a fusion processing (which is implemented based on a voting mechanism or an average mechanism) is performed on a network layer of each model during forward calculation, and a final result may be obtained directly from an output layer of the model. This fusion mode has a relatively small delay in an implementation process without requiring a fusion processing at a back end, but requires network structure of various model to be the same. Therefore, acoustic models with different structures cannot be fused, which limits diversification of the models. However, significance of model fusion is to combine advantages of different acoustic modeling methods to obtain a most ideal result. Therefore, this fusion mode is not practically significant.

The second type is Lattice-based fusion in Kaldi. Kaldi is currently the hottest open-source tool in the field of speech recognition. Lattice is a decoded graph based on a WFST structure in the Kaldi tool, with first N optimal paths being saved after decoding. According to this fusion mode, a result graph of a Lattice structure may be first generated after decoding is performed by a speech recognition system, and then a search for a best recognition result is performed by using the Viterbi algorithm. In view of the above, the foregoing fusion mode is to find an optimal result on decoded graphs of a plurality of speech recognition models. A basic idea of the fusion mode is to tailor all the decoded graphs first, maintain first M optimal decoding results, and then perform voting or average on the M results, so as to obtain a final result. Because there are richer result paths in the Lattice, according to this type of methods, better results may be usually achieved after fusion. However, the foregoing fusion mode is applicable to merely a model under the Kaldi tool. For other acoustic models without a Lattice structure, the foregoing fusion mode cannot be implemented accordingly. Moreover, saving of Lattice is generally only for offline decoding in Kaldi, and saving of Lattice during online decoding may greatly increase time consumption and affect real-time performance of a system. Therefore, the foregoing fusion mode has a poor scalability, and may be applied to merely offline decoding under the Kaldi tool.

The third type is fusion based on a Hypothesis file. The Hypothesis file may be understood as a final output result of the speech recognition system. According to this method, for recognition results of the models, alignment is performed first, and then fusion is performed through voting or average. This method has a strong scalability and may be applied to models with different structures, where a fusion effect depends on a fusion strategy. However, because alignment of a multi-dimensional text is too complicated, fusion may be performed only for two models at present, and a commonly used fusion strategy is too simple. A final improvement effect of this method is not obvious.

Figure 1:
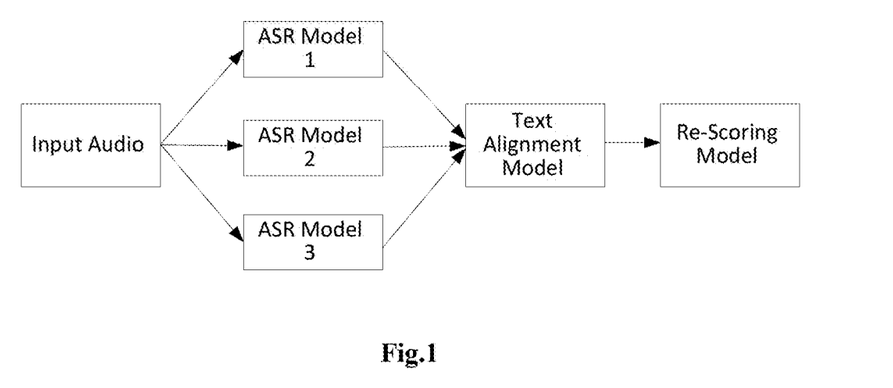
FIG. 1 is a diagram of an optional structure of a text output system according to an embodiment of the present application.

To resolve the foregoing defects in the prior art, the present application provides a text output system. Alignment is performed for recognition results of different ASR systems by using a multi-text alignment algorithm, and then an optimal recognition result is selected through a re-scoring strategy. Finally, an objective of improving a recognition rate of the system is achieved. FIG. 1 is a diagram of an optional structure of a text output system according to an embodiment of the present application. As shown in FIG. 1, the text output system provided in the embodiment of the present application includes at least an automatic speech recognition (ASR) model group, a text alignment model, and a re-scoring model that are sequentially connected to each other.

The ASR model group includes a plurality of ASR models, and each ASR model is configured to convert input audio data into respective first text.

The text alignment model is configured to perform alignment for a plurality of the first texts, to obtain a plurality of target texts, where lengths of the plurality of target texts are all equal.

The re-scoring model is configured to score words/terms at each alignment position of the plurality of target texts, to obtain a word/term with the highest score at each alignment position to serve as a target word/term, and determine the target word/terms, as an output text, by the respective alignment positions.

It should be noted that, structures of the plurality of ASR models provided in the embodiment of the present application may all be the same, or may be partially the same, or may all be different, which are not limited in this embodiment of the present application.

In an embodiment, the ASR model group includes a plurality of models that are trained according to different modeling methods; and/or models that are trained by using different network structures or different hyperparameters under a same framework; and/or models that are trained by using a same network structure under a same framework, with different decoding parameters being set during test.

The text output system provided in the embodiment of the present application may be applied to all scenarios to which speech recognition is applicable, including but not limited to Mandarin recognition, dialect recognition, and speech recognition in other languages.

Figure 2:
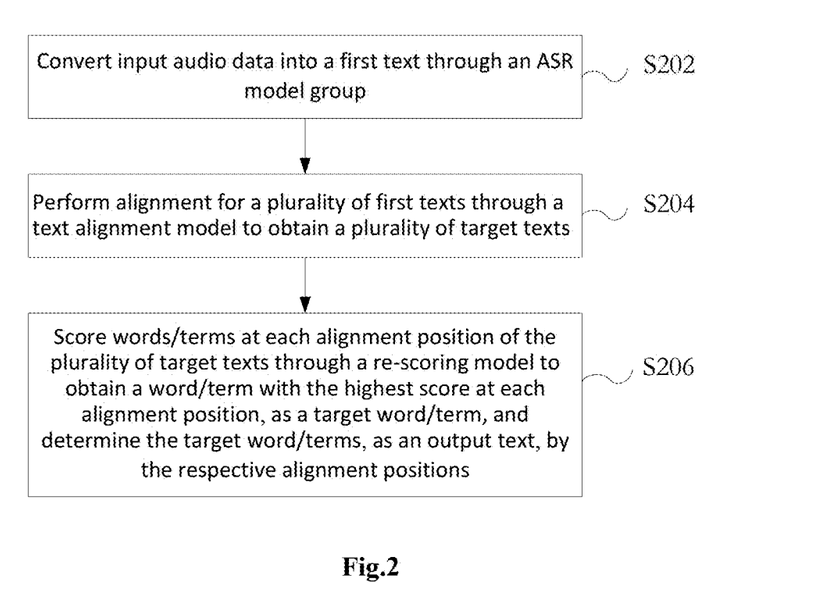
FIG. 2 is an optional flowchart of a text output method according to an embodiment of the present application.

A text output method is further provided in another embodiment of the present application, which is applied to the foregoing text output system. FIG. 2 is an optional flowchart of a text output method according to an embodiment of the present application. As shown in FIG. 2, the method includes:

Step S202. Convert input audio data into a first text through an ASR model group, where the ASR model group includes a plurality of ASR models;

Step S204. Perform alignment for a plurality of first texts through a text alignment model, to obtain a plurality of target texts, where lengths of the plurality of target texts are all equal; and Step S206. Score words/terms at each alignment position of the plurality of target texts through a re-scoring model, to obtain a word/term with the highest score at each alignment position to serve as a target word/term, and determine the target word/terms as an output text by the respective alignment positions.

It should be noted that the plurality of ASR models may be models that are trained according to different modeling methods, such as RNNT-based end-to-end models, transformer framework-based end-to-end models, or WFST-based speech models; may also be models that are trained by using different network structures or different hyperparameters under a same framework, such as TDNNF-based chain models under WFST or (CNN+TDNNF+ATTENTION)-based chain models under WFST; or may still be models that are trained by using a same network structure under a same framework, with different decoding parameters being set during test. For example, sizes of different acoustic scales, decoding widths (beams), endpoint detection (vad) thresholds or the like are set during decoding of a WFST-based system. Due to different configurations, these ASR models are complementary to each other.

Before step S202, the method further includes: inputting an audio file or an audio stream in a preset format (the preset format is a format that meets requirements of the ASR model, which is not limited in this embodiment of the present application) into the system, where the audio stream enters the plurality of ASR models. Subsequently, the plurality of ASR models respectively recognize the audio stream and output texts, where the output texts are sent to the text alignment model.

In an embodiment, step S204 may be implemented according to the following steps:

aligning a first reference text with other first texts sequentially, to obtain a plurality of second texts, where the first reference text is a text with the longest length among the plurality of first texts, and an alignment position at which a word/term is missing in the second text is padded with preset characters; and determining the plurality of second texts as the target texts when lengths of the plurality of second texts are all equal; and determining a text with the longest length among the plurality of second texts as a second reference text when lengths of the plurality of second texts are not equal, and aligning the second reference text with other second texts sequentially, to obtain the plurality of target texts, where an alignment position at which a word/term is missing in the target text is padded with the preset characters.

It should be noted that, the text alignment model is configured to align the texts, by words or terms, correspondingly output from the plurality of ASR models, wherein a missing part is padded with symbols. In the prior art, a commonly used manner for text alignment is to trace back a path based on an edit distance algorithm to obtain alignment of two input texts. However, alignment for a plurality of texts (more than two texts) cannot be performed according to the foregoing manner. Specific reasons are that a plurality of texts are in a multi-dimensional matrix that is quite complicated for calculation, and it is unknown whether a corresponding result can be calculated. Even if the corresponding result may be calculated, time consumption is unimaginable. Therefore, alignment for a plurality of texts cannot be implemented according to the foregoing manner. Therefore, according to a multi-text alignment manner provided in the embodiment of the present application, the alignment of multiple texts may be effectively implemented by means of twice alignment.

In the first alignment manner provided in the embodiment of the present application, aligning the first reference text with other first texts sequentially, to obtain a plurality of second texts includes:

simultaneously calculating an edit distance of an $i^{th}$ first text among (m−1) first texts relative to the first reference text and an edit distance of the first reference text relative to the $i^{th}$ first text, to obtain two second texts based on the $i^{th}$ first text being aligned with the first reference text, where m is a number of the first texts, the (m−1) first texts exclude the first reference text, and it is satisfied that i<m−1; and sequentially obtaining 2*(m−1) second texts based on the (m−1) first texts being aligned with the first reference text.

In an embodiment, sequentially obtaining the 2*(m−1) second texts based on the (m−1) first texts being aligned with the first reference includes:

designating any one of the two second texts based on the $i^{th}$ first text being aligned with the first reference text as a determining text, where lengths of the two second texts based on the $i^{th}$ first text being aligned with the first reference text are the same; and sequentially comparing lengths of a determining text corresponding to the $i^{th}$ first text and a determining text corresponding to an $(i+1)^{th}$ first text, to determine, as a target determining text, a determining text with the longest length among the determining texts corresponding to the (m−1) first texts.

In an embodiment, determining the target determining text as the second reference text when lengths of the 2*(m−1) second texts are not equal.

Figure 3:
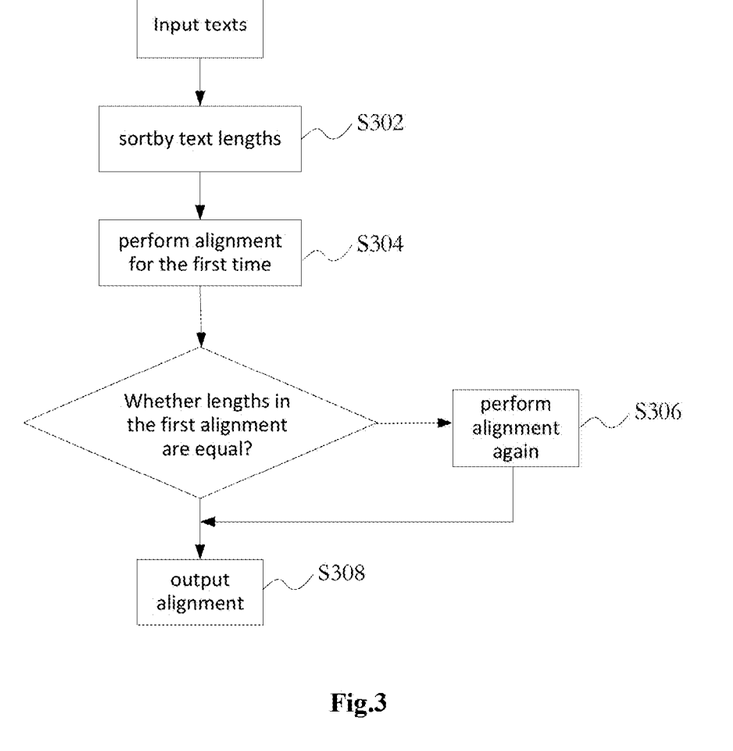
FIG. 3 is a flowchart of a text alignment method according to an embodiment of the present application.

It should be noted that what is described above is the first alignment manner provided in the embodiment of the present application. A process of the first text alignment is explained below by using an example. FIG. 3 is a flowchart of a text alignment method according to an embodiment of the present application. As shown in FIG. 3, the text alignment method provided in the embodiment of the present application includes the following steps.

Step S302. Sort input texts by text lengths, where the longest text is defined as a reference text, and the reference text is fixed at a position of a first parameter.

Step S304. Align the reference text with all remaining texts sequentially, to obtain corresponding alignment results. All alignment results are results of a first alignment. The alignment result herein is equivalent to the foregoing second text.

Specifically, the alignment manner in step S304 is specifically to calculate edit-distances of all the remaining texts relative to the reference text respectively, to obtain the alignment results. All the alignment results are the results of the first alignment.

Step S306. Check whether all the alignment results among the results of the first alignment are equal, and end the alignment if the alignment results are equal; if the alignment results are not equal, select out the longest alignment result, and calculate edit distances of the remaining alignment results among the results of the first alignment relative to the longest alignment result respectively, to obtain new alignment results. The new alignment result herein is equivalent to the foregoing target text.

Step S308. Pad missing parts with symbols "**", so that lengths of all texts in a final alignment result are consistent.

Steps S302 to S308 are described below by using an example.

There are three input texts, which respectively are: a first input text: ABC; a second input text: C; and a third input text: EFD.

First, alignment for the three input texts is performed for the first time, including the following steps.

The texts are sorted by text lengths. According to a sorting result, lengths of the first input text and the third input text are equal. Therefore, the first input text is randomly selected as the reference text and is fixed at the position of the first parameter.

The reference text is aligned with all remaining texts sequentially, where the missing parts are padded with symbols "*", so as to obtain the corresponding alignment results. All the alignment results are the results of the first alignment.

An alignment result 1 of the second input text with respect to the first input text: **C.

An alignment result 2 of the first input text with respect to the second input text: ABC.

An alignment result 3 of the third input text with respect to the first input text: ***EFG.

An alignment result 4 of the first input text with respect to the third input text: ABC***.

The alignment results 1 to 4 constitute the results of the first alignment. Obviously, among the four alignment results included in the results of the first alignment, lengths of alignment results 1 to 4 are not equal. Therefore, a second alignment is required in the following.

The second alignment includes the following steps.

The alignment results 1 to 4 are sorted. According to a sorting result, lengths of the alignment result 3 and the alignment result 4 are equal. Therefore, the alignment result 4 is randomly selected as a new reference text and is fixed at the position of the first parameter.

The reference text is respectively aligned with all remaining texts, where missing parts are padded with symbols "**", so as to obtain corresponding alignment results. All the alignment results are results of the second alignment.

The alignment result 1 with respect to the alignment result 4: C*.

The alignment result 4 with respect to the alignment result 1: ABC***.

The alignment result 2 with respect to the alignment result 4: ABC***.

The alignment result 4 with respect to the alignment result 2: ABC***.

The alignment result 3 with respect to the alignment result 4: ***EFG.

The alignment result 4 with respect to the alignment result 3: ABC***.

In this case, lengths of the new alignment results are equal. Therefore, alignment may be ended and may be output.

In an embodiment, a second alignment manner may be used to perform alignment for a plurality of texts. The method is as follows:

respectively calculating an edit distance of a $p^{th}$ first text among (n−1) first texts relative to the first reference text or an edit distance of the first reference text relative to the $p^{th}$ first text, to obtain (n−1) second texts, where n is a number of the first texts, the (n−1) first texts exclude the first reference text, and it is satisfied that p<n−1.

In an embodiment, after the (n−1) second texts are obtained, the method further includes:

traversing the (n−1) second texts, and determining a text with the longest length among the (n−1) second texts as the second reference text when lengths of the (n−1) second texts are not equal.

It should be noted that, in the first alignment manner, theoretically there are consistent lengths between the alignment results 1 and 2 and between the alignment results 3 and 4. Therefore, only from the perspective of a final calculation result, during the first alignment process, alignment and subsequent re-score processing may be implemented by obtaining only any result between the alignment results 1 and 2, or any result between the alignment results 3 and 4.

In view of the above, in the first alignment manner (manner 1), alignment results are output twice for any two alignment objects. In the second alignment manner (manner 2), alignment results are output once for any two alignment objects.

There is no difference between the manner 1 and the manner 2 in final alignment results. However, during the first alignment process of the manner 1, the alignment result 2 and the alignment result 4 are alignment results of the reference text (the first input text) with respect to the second input text and the third input text, respectively, which may be marked as alignment results to which the reference text is subordinate/affiliated during a calculation process. During an actual calculation process, the alignment results 1 and 2 may be calculated synchronously. Meanwhile, a determining text may be generated for the reference text, and the alignment result 2 may be taken as the determining text. In subsequent calculations, the alignment result to which the reference text is subordinate/affiliated is also taken as a determining text. If a length of a new determining text is less than or equal to that of an original determining text, the determining text remains unchanged. If a length of a newly inserted determining text is greater than that of the original determining text, the determining text is updated to the new determining text. In this way, after the reference text is aligned with each of texts, the corresponding determining text is a text with the longest length. Meanwhile, it may be determined, based on a number of times for which the determining text is updated, whether the alignment results between the determined reference text and the each of texts are consistent. To be specific, if the determining text is updated, it is indicated that the alignment results are inconsistent. If the determining text is not updated (the number of times for update is 0), it is indicated that the alignment results are consistent. (Implementation of this process depends on that the alignment results to which the reference text is subordinate/affiliated are all related to the reference text, such as ABC and ABC***).

Compared with this, in the foregoing manner 2, since there is no such relationship among the alignment results between the reference text and each of the texts, all the alignment results need to be traversed to determine whether the lengths of the plurality of alignment results are consistent, and determine which alignment result is the longest, serving as a reference text for a next round. In the case of a further increase in a number of texts for comparison due to a further increase in a number of the ASR models, a number of alignment results that need to be processed may also increase significantly. Therefore, time for obtaining the second text is not increased by using the manner 1 of simultaneously calculating the edit distance of the $i^{th}$ first text in the (m−1) first texts relative to the first reference text and the edit distance of the first reference text relative to the $i^{th}$ first text, and obtaining the two second texts based on the $i^{th}$ first text being aligned with the first reference text. After a plurality second texts are obtained sequentially, the one with the longest length is determined, and there is no need to traverse all the alignment results. In this way, processing time of the alignment results may be significantly reduced, so as to improve overall recognition efficiency of the system, thereby avoiding a problem of an excessive long recognition delay.

In addition, according to the foregoing manner 1, the determining text is selected as a new reference text during the second alignment process. Therefore, the new reference text is still the alignment result to which the reference text is subordinate/affiliated during the first alignment, and there is associated implementation logic in the two alignment processes. If manner 2 is used, there is no necessary correlation between the new reference text selected in the second alignment process and the original reference text. As a result, implementation logic in the two alignments is relatively random. The time delay is further increased due to the foregoing differences. Moreover, during engineering implementation, previous and subsequent logic may improve convenience of personnel programming, and effectively avoid operation errors of the system.

In an embodiment, step 206 of scoring the words/terms at each alignment position of a plurality groups of second texts (target texts) through the re-scoring model, to obtain the word/term with the highest score at each alignment position to serve as the target word/term includes:

obtaining term frequency scores and confidence scores of words/terms at target alignment positions of the plurality groups of second texts, where the term frequency score is determined according to a probability of the word/term appearing at the target alignment position, and the confidence score is determined based on confidence of the word/term output from each ASR model;

adding the term frequency score and the confidence score of the word/term at the target alignment position, to obtain a target score of the word/term at the target alignment position; and determining a word/term with the highest target score at the target alignment position as a target word/word at the target alignment position.

In an embodiment, obtaining the term frequency scores and the confidence scores of the words/terms at the target alignment positions of the plurality groups of second texts includes:

multiplying the probability of the word/term appearing at the target alignment position with a first weight, to obtain the term frequency score of the word/term; and multiplying a mean value of the confidence of the words/terms output from various ASR models with a second weight, to obtain the confidence score of the word/term, where a sum of the first weight and the second weight is 1.

It should be noted that aligned text results (that is, the foregoing target texts) are sent to the re-scoring model for re-scoring by a scoring formula:

$$\text{scores}(w) = \frac{\alpha N(w)}{NS} + (1-\alpha)\sum_{i}^{NS}\frac{C_{w,i}}{N(w)}$$

α is a weight coefficient, 0<=α<=1, with an empirical value of 0.6 taken in this embodiment of the present application, which is not limited thereto. The first half of the formula represents a term frequency score of a term w. N(w) represents a number of times for which the word/term appears at a current position. NS represents a total number of input texts, that is, the number of the ASR models. N(w)/NS represents a probability of the term w appearing at the current position. A sum of probabilities of all terms appearing at the current position respectively should be 1. The word frequency score of the term w is obtained by multiplying the probability of appearance by the coefficient α. The second half of the formula represents a confidence score of the term w. $C_{w,i}$ represents confidence of the term w in an $i^{th}$ sentence. $\Sigma C_{w,i}$ represents a sum of confidences of the term w at the current positions of each of texts. Average confidence of the term word w at the current position is obtained by dividing the sum of confidence by N(w). Further, the confidence score of the term w is obtained by multiplying the average confidence by a weight coefficient (1−α). The confidence of each term w is provided by the corresponding ASR model during a speech recognition process.

Finally, the score (w) of each term w is obtained by adding the term frequency score and the term confidence score, which serves as a final score of the term at the current position. Based on scores of all terms at each position, the term with the highest score may be obtained and may be selected as an optimal result. If a final result has a identifier "**", it is indicated that the position should be vacant. A complete recognition result may be obtained by applying this formula at each position of an alignment path.

Descriptions are made below by using specific examples and the text output method provided in the embodiment of the present application.

Exemplary Embodiment 1

This exemplary embodiment is an intelligent speech outbound call scenario, where a customer interacts with an intelligent customer service center through a telephone terminal.

There are three ASR models in this example, all of which are WFST structures with different network structures under Kaldi, with respectively a 15-layer TDNNF layer, SpecAugment+TDNNF, and TDNNF+ATTENTION. Other hyperparameters are set according to the foregoing details section.

At beginning of test, a speaker said: "Today the weather is indeed good" ("今天天气的 确是不错哈") This audio data stream is transmitted to three deployed ASR systems through a telephone channel, and corresponding output information is obtained through decoding, with respective recognition results: "Today the whether is indeed good" ("今天天气的确凹不错哈"), "Today weather is indeed good" ("今天气的确是不错哈"), and "Today the weather is indeed wood" ("今天天气的确是不错啊"). It may be seen that there are incorrect places in each 今天天气的确是不错啊 recognition result, but the three results have common places that are correctly recognized. The results are complementary. Subsequently, the alignment model performs alignment for the recognition results of the three ASR models, where vacancies in the alignment process may be padded with "". After the alignment is completed, a multi-text alignment result is sent to the re-scoring model, and the re-scoring model selects a term with the highest score as output according to a term frequency and confidence. For the specific alignment and the scoring result, reference may be made to FIG. 4**. The final output result is "Today the weather is indeed good".

Exemplary Embodiment 2

This exemplary embodiment is an intelligent speech interaction scenario, where a speaker interacts with a client through a microphone. Because the real-time interaction scenario is relatively complex, there are five ASR systems deployed in this embodiment, with respectively a 15-layer TDNNF structure, a SpecAugment TDNNF structure, a (TDNNF+ATTENTION) structure, a (CNN+TDNNF) structure, and a (CNN+TDNNF+ATTENTION) structure. Other hyperparameters are set according to the foregoing details section.

At beginning of test, a speaker said: "What is a difference between an inactivated vaccine and an mRNA vaccine" ("灭活疫苗与 mRNA 疫苗有什么区别). After being picked up by the microphone, this audio data is transmitted to the five deployed ASR systems, and corresponding output information is obtained through decoding, with respective recognition results: "What is a difference between an in activated vaccine and am RNA vaccine" ("没有哦疫苗与恩 RNA 疫苗有什么区别)", "What is a difference between an inactivated vaccine end an mRNA vaccine" ("灭活疫苗雨 mRNA 疫苗有什么区别"), "What is a difference between an inactivated waxy and an mRNA waxy" ("灭活 一秒与 mRNA 一秒有什么区别"), "What is a difference between an inactivity vaccine and am RNA vaccine" ("没活疫苗与恩 RNA 疫苗有什 么区别"), and "What's a difference between an inactivated vaccine and an mRNA vaccine" ("灭 活疫苗与 mRNA 疫苗有甚区别"). It may be seen that each single recognition result is quite different from the correct result, but there are still a lot of common places among the recognition results, among which there is complementary. Subsequently, the alignment model performs alignment for the recognition results of the five ASR models, where vacancies in the alignment process may be padded with "". After the alignment is completed, a multi-text alignment result is sent to the re-scoring model, and the re-scoring model selects a term with the highest score as output according to a term frequency and confidence. For a specific result, reference may be made to FIG. 5. The final output result is "What is a difference between an  inactivated vaccine and an mRNA vaccine".

The embodiments of the present application are applicable to all products to which speech recognition projects may be applied, including but not limited to other intelligent speech interaction terminals such as intelligent outbound call systems, intelligent speech speakers, intelligent speech remote controls, and intelligent speech large screens. According to the text output method provided in the embodiment of the present application, through the multi-text alignment algorithm, a plurality of texts may be simultaneously aligned without significantly increasing time consumption. According to the re-scoring strategy, information about the term frequency and the confidence may be fused at the same time, thereby improving the fusion effect. After the fusion, the model may be improved stably.

Optionally, in this embodiment, persons of ordinary skills in the art may understand that all or some of the steps in various methods in the foregoing embodiments may be completed by instructing hardware related to a terminal device through a program. The program may be stored in a computer-readable storage medium. The storage medium cam include: a flash drive, a read-only memory (ROM), a random access memory (RAM), a magnetic disk, or a compact disc.

Sequence numbers indicating the foregoing embodiments of the present application are only for description, and do not represent superiority or inferiority of the embodiments.

If an integrated unit in the foregoing embodiment is implemented in a form of a software functional unit and is sold or used as an independent product, the integrated unit may be stored in the foregoing computer-readable storage medium. On the basis of such understanding, the technical solutions of the present application essentially, or parts of the technical solutions of the present application that attribute to the prior art, or all or part of the technical solutions may be represented in the form of software products. A computer software product may be stored in a storage medium, and includes a plurality of instructions to enable one or more computer devices (which may be a personal computer, a server, or a network device) to implement all or some steps of the method in all embodiments of the present application.

In the foregoing embodiments of the present application, the description of each embodiment has its own focus. For parts that are not described in detail in an embodiment, reference may be made to related descriptions of other embodiments.

In the embodiments provided in the present application, it should be understood that the disclosed client may be implemented in other manners. For example, the device embodiments described above are merely exemplary. For example, the division of units is only a division of logical functions. In actual implementations, there may be other division manners. For example, a plurality of units or components may be combined or may be integrated into another system, or some features may be ignored or not implemented. In addition, the displayed or discussed mutual coupling or direct coupling or communication connection may be indirect coupling or communication connections through some interfaces, units, or modules, and may be in electrical or other forms.

The units described as separated parts may be or may not be physically separated; and parts displayed as units may be or may not be physical unit, that is, may be located at one place or may be distributed on a plurality of network units. Some or all of the units may be selected according to actual requirements to achieve the objectives of the solutions of the embodiments.

In addition, all functional units in the embodiments of the present application may be integrated into one processing unit, or each unit may exist alone physically, or two or more units may be integrated into one unit. The foregoing integrated unit may be implemented in a form of hardware, or may be implemented in a form of a software function unit.

Merely preferred implementations of the present application are described above. It should be noted that for persons of ordinary skills in the art, improvements and modifications may be made without departing from the principles of the present application, and these improvements and modifications should also be considered as being subject to the protection scope of the present application.

What is claimed is:

1. A text output system, wherein the system comprises at least an automatic speech recognition (ASR) model group, a text alignment model, and a re-scoring model that are sequentially connected to each other, wherein
   the ASR model group comprises a plurality of ASR models, and each ASR model is configured to convert input audio data into respective first texts;
   the text alignment model is configured to align a first reference text, which is a text with the longest length among a plurality of the first texts, with other first texts sequentially to obtain a plurality of second texts, wherein an alignment position at which a word/term is missing in the second text is padded with preset characters; determine the plurality of second texts as target texts when lengths of the plurality of second texts are all equal; and determine a text with the longest length among the plurality of second texts as a second reference text when lengths of the plurality of second texts are not equal; and align the second reference text with other second texts sequentially to obtain a plurality of target texts, wherein an alignment position at which a word/term is missing in the target text is padded with the preset characters, and lengths of the plurality of target texts are all equal; and the re-scoring model is configured to score words/terms at each alignment position of the plurality of target texts to obtain, as a target word/term, a word/term with the highest score at each alignment position; and determine the target word/terms, as an output text, by the respective alignment positions.

2. The text output system according to claim 1, wherein the ASR model group comprises a plurality of models that are trained according to different modeling methods; and/or models that are trained by using different network structures or different hyperparameters under a same framework; and/or models that are trained by using a same network structure under a same framework, with different decoding parameters being set during test.

3. A text output method, comprising:

converting input audio data into a first text through an ASR model group, wherein the ASR model group comprises a plurality of ASR models;

performing alignment for a plurality of first texts through a text alignment model to obtain a plurality of target texts, wherein lengths of the plurality of target texts are all equal; and scoring words/terms at each alignment position of the plurality of target texts through a re-scoring model to obtain, as a target word/term, a word/term with the highest score at each alignment position, and determining the target word/terms, as an output text, by the respective alignment positions, wherein the performing alignment for a plurality of first texts through a text alignment model to obtain a plurality of target texts comprises:

aligning a first reference text, which is a text with the longest length among the plurality of first texts, with other first texts sequentially to obtain a plurality of second texts, wherein an alignment position at which a word/term is missing in the second text is padded with preset characters; and determining the plurality of second texts as the target texts when lengths of the plurality of second texts are all equal; and determining a text with the longest length among the plurality of second texts as a second reference text when lengths of the plurality of second texts are not equal, and aligning the second reference text with other second texts sequentially, to obtain the plurality of target texts, wherein an alignment position at which a word/term is missing in the target text is padded with the preset characters.

4. The method according to claim 3, wherein the aligning a first reference text with other first texts sequentially to obtain a plurality of second texts comprises:

simultaneously calculating an edit distance of an $i^{th}$ first text among (m−1) first texts relative to the first reference text and an edit distance of the first reference text relative to the $i^{th}$ first text, to obtain two second texts based on the $i^{th}$ first text being aligned with the first reference text, wherein m is a number of the first texts, the (m−1) first texts exclude the first reference text, and it is satisfied that i≤m−1; and sequentially obtaining 2*(m−1) second texts based on the (m−1) first texts being aligned with the first reference text.

5. The method according to claim 4, wherein the sequentially obtaining 2*(m−1) second texts based on the (m−1) first texts being aligned with the first reference text comprises:

designating any one of the two second texts based on the $i^{th}$ first text being aligned with the first reference text as a determining text, wherein lengths of the two second texts based on the $i^{th}$ first text being aligned with the first reference text are the same; and determining, as a target determining text, a determining text with the longest length among the determining texts corresponding to the (m−1) first texts by sequentially comparing lengths of a determining text corresponding to the $i^{th}$ first text and a determining text corresponding to an $(i+1)^{th}$ first text.

6. The method according to claim 5, wherein after determining, as the target determining text, the determining text with the longest length among the determining texts corresponding to the (m−1) first texts, the method further comprises:

determining the target determining text as the second reference text when lengths of the 2*(m−1) second texts are not equal.

7. The method according to claim 3, wherein the aligning a first reference text with other first texts sequentially to obtain a plurality of second texts comprises:

respectively calculating an edit distance of a $p^{th}$ first text among (n−1) first texts relative to the first reference text or an edit distance of the first reference text relative to the $p^{th}$ first text, to obtain (n−1) second texts, wherein n is a number of the first texts, the (n−1) first texts exclude the first reference text, and it is satisfied that p≤n−1.

8. The method according to claim 7, wherein after the (n−1) second texts are obtained, the method further comprises:

traversing the (n−1) second texts, and determining a text with the longest length among the (n−1) second texts as the second reference text when lengths of the (n−1) second texts are not equal.

9. The method according to claim 3, wherein the scoring words/terms at each alignment position of the plurality of target texts through a re-scoring model to obtain, as a target word/term, a word/term with the highest score at each alignment position comprises:

obtaining term frequency scores and confidence scores of words/terms at target alignment positions of the plurality of target texts, wherein the term frequency score is determined according to a probability of the word/term appearing at the target alignment position, and the confidence score is determined according to confidence of the word/term output from each ASR model;

adding the term frequency score and the confidence score of the word/term at the target alignment position, to obtain a target score of the word/term at the target alignment position; and determining a word/term with the highest target score at the target alignment position as a target word/word at the target alignment position.

10. The method according to claim 9, wherein the obtaining term frequency scores and confidence scores of words/terms at target alignment positions of the plurality of target texts comprises:

multiplying the probability of the word/term appearing at the target alignment position with a first weight, to obtain the term frequency score of the word/term; and multiplying a mean value of the confidence of the words/terms output from the respective ASR models with a second weight, to obtain the confidence score of the word/term, wherein a sum of the first weight and the second weight is 1.

11. The method according to claim 3, wherein the ASR model group comprises a plurality of models that are trained according to different modeling methods; and/or models that are trained by using different network structures or different hyperparameters under a same framework; and/or models that are trained by using a same network structure under a same framework, with different decoding parameters being set during test.

12. A non-transitory computer readable storage medium, in which a computer program is stored, and used for implementing, when being executed, the method according to claim 3.

13. An electronic device, comprising a memory and a processor, wherein a computer program is stored in the memory, and the processor is configured to execute the computer program to implement the method according to claim 3.

14. An electronic device, comprising a memory and a processor, wherein a computer program is stored in the memory, and the processor is configured to execute the computer program to implement the method according to claim 4.

15. An electronic device, comprising a memory and a processor, wherein a computer program is stored in the memory, and the processor is configured to execute the computer program to implement the method according to claim 5.

16. An electronic device, comprising a memory and a processor, wherein a computer program is stored in the memory, and the processor is configured to execute the computer program to implement the method according to claim 6.

17. An electronic device, comprising a memory and a processor, wherein a computer program is stored in the memory, and the processor is configured to execute the computer program to implement the method according to claim 7.

18. An electronic device, comprising a memory and a processor, wherein a computer program is stored in the memory, and the processor is configured to execute the computer program to implement the method according to claim 8.

19. An electronic device, comprising a memory and a processor, wherein a computer program is stored in the memory, and the processor is configured to execute the computer program to implement the method according to claim 9.

20. An electronic device, comprising a memory and a processor, wherein a computer program is stored in the memory, and the processor is configured to execute the computer program to implement the method according to claim 10.

* * * * *